(12) United States Patent
Murakami et al.

(10) Patent No.: US 6,324,290 B1
(45) Date of Patent: *Nov. 27, 2001

(54) METHOD AND APPARATUS FOR DIAGNOSING SOUND SOURCE AND SOUND VIBRATION SOURCE

(75) Inventors: Kazutomo Murakami, Yokohama; Keiichiro Mizuno, Ota-ku; Hirokazu Kudoh, Hoya, all of (JP)

(73) Assignee: Bridgestone Corporation, Toyko (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,759

(22) Filed: Oct. 14, 1997

Related U.S. Application Data

(63) Continuation-in-part of application No. 08/398,444, filed on Mar. 3, 1995, now abandoned.

(30) Foreign Application Priority Data

Mar. 8, 1994 (JP) .................................................. 6-636931

(51) Int. Cl.$^7$ ..................................................... H04R 3/00
(52) U.S. Cl. ............................. 381/92; 381/71.1; 367/119
(58) Field of Search .................................. 381/71.1, 71.2, 381/71.11, 71.12, 71.14, 71.4, 71.7, 94.1, 95, 86, 73.1, 56, 92, 313; 704/226, 227, 234, 270, 276; 318/128; 367/119, 118, 121, 124, 125, 126, 129

(56) References Cited

U.S. PATENT DOCUMENTS 4,862,506 8/1989 Landgarten et al. .
4,929,874 5/1990 Mizuno et al. .
5,319,715 6/1994 Nagami et al. .
5,440,641 8/1995 Kuusama .
5,493,616 2/1996 Iidaka et al. .
5,917,921 * 6/1999 Sasaki et al. ....................... 381/94.1

FOREIGN PATENT DOCUMENTS

| 0555786 | 8/1993 | (EP) . |
| A-50-11475 | 2/1975 | (JP) . |
| 04015524 A | 1/1992 | (JP) . |
| A-5-26722 | 2/1993 | (JP) . |

OTHER PUBLICATIONS

Linqvist et al. "System Optimization for Active Control of Sound Fields in Rooms", *INTERNOISE*, vol. 2 (Aug.–Sep. 1988), pp. 979–981.

* cited by examiner

Primary Examiner—Vivian Chang
Assistant Examiner—Brian T. Pendleton
(74) Attorney, Agent, or Firm—Oliff & Berridge, PLC.

(57) ABSTRACT

Acoustics or vibrations at a plurality of predetermined positions are respectively detected in the form of analog values, and the detected analog values are respectively converted into digital values. The digital values are subjected to digital filtering by using the digital values and filter factors, and at least one of the filter factors is changed such that the difference between the total sum of the results of digital filtering and a targeted value becomes minimum. The rate of contribution to an evaluation point is computed by using the results of digital filtering within a predetermined time when the difference becomes minimum, and the computed rate of contribution is displayed.

13 Claims, 12 Drawing Sheets

METHOD AND APPARATUS FOR DIAGNOSING SOUND SOURCE AND SOUND VIBRATION SOURCE

This is a Continuation-in-Part of application Ser. No. 08/398,444, filed Mar. 3, 1995 now abandoned.

BACKGROUND OF THE INVENTION

1. Field of Invention

The present invention relates to a method for and an apparatus for diagnosing a sound source and a vibration source, and more particularly to a method for and an apparatus for diagnosing a sound source and a vibration source which, in a transmitting system in which one or a plurality of sound sources or vibration sources constitute causes of sounds or vibrations at an evaluation point, make it possible to visually and quantitatively diagnose the sound sources or vibration sources contributing largely to the evaluation point, and can be used in making effective improvements.

2. Description of Related Art

Conventionally, as a method of analyzing the contribution of sound sources or vibration sources to an evaluation point, a method has been proposed in which, in a frequency domain, correlational components are determined from a transfer function between the respective sound sources or vibration sources and the evaluation point, and the rates of contribution of the sound sources or vibration sources to the evaluation point are determined from these correlational components.

Further, in recent years, a technique has been proposed for diagnosing the contribution of sound sources or vibration sources by using adaptive digital filters in a time domain (Japanese Patent Application Laid-Open No. 526722).

However, with the above-described conventional method of analyzing contribution in the frequency domain, only amplitude information is used, and phase information is not considered. Therefore, if there are strong correlations among inputs, analysis becomes difficult. In addition, it takes time in analysis, so that it is impossible to obtain results instantly, and steady data for a long time is required.

On the other hand, with the above-described conventional method of analyzing contribution in the time domain, analysis in operating conditions, i.e., in real time, becomes possible. In consequence, however, only the time waveform is obtained, and since the rates of contribution are evaluated from the magnitude of the amplitude of the time waveform, it is possible to determine only qualitative and approximate rates of contribution although they are determined in real time. Thus, there is a problem in that it is impossible to evaluate the degrees of instantaneous, quantitative contribution (contribution rates).

SUMMARY OF THE INVENTION

The present invention has been devised in view of the above-described circumstances, and its object is to provide a method for and an apparatus for diagnosing a sound source and a vibration source, which have higher practical values by making it possible to evaluate a rate of quantitative contribution in real time.

To attain the above object, in accordance with a first aspect of the present invention, there is provided a method of diagnosing a rate of contribution of a sound source or a vibration source, comprising the steps of: detecting sounds at a sound source or vibrations at a vibration source in the form of an analog value and then converting the analog value into a digital value, or detecting sounds at the sound source or vibrations at the vibration source in the form of a digital value; performing digital filtering by using the digital value and a filter factor which is changed such that a result of digital filtering approaches a targeted value; and computing the rate of contribution of the sound source or the vibration source to an evaluation point on the basis of the result of digital filtering, and displaying the same.

In accordance with a second aspect of the present invention, there is provided an apparatus for diagnosing a rate of contribution of a sound source or a vibration source, comprising: means including a sensor for detecting sounds or vibrations at a predetermined position in the form of an analog value and an analog-digital converting circuit for converting the analog value into a digital value, or including a sensor for detecting sounds or vibrations at a predetermined position in the form of a digital value; a plurality of filters each adapted to perform digital filtering by using a filter factor and one of a plurality of digital values generated by delaying the digital value a plurality of times; changing means for changing at least one of the filter factors such that a difference between a total sum of results of digital filtering and a targeted value becomes minimum; and a contribution-rate computing circuit for computing the rate of contribution to an evaluation point by using outputs of the plurality of filters within a predetermined time when the difference becomes minimum.

In accordance with a third aspect of the present invention, there is provided an apparatus for diagnosing a rate of contribution of a sound source or a vibration source, comprising: means including a plurality of sensors each detecting sounds or vibrations at a predetermined position in the form of an analog value and a plurality of analog-digital converting circuits each converting the analog value into a digital value, or including a plurality of sensors each detecting sounds or vibrations at a predetermined position in the form of a digital value; a plurality of filters each adapted to perform digital filtering by using the digital value and a filter factor; changing means for changing at least one of the filter factors such that a difference between a total sum of outputs of the plurality of filters and a targeted value becomes minimum; and a contribution-rate computing circuit for computing the rate of contribution to an evaluation point by using the outputs of the plurality of filters within a predetermined time when the difference becomes minimum.

In accordance with the first aspect of the present invention, sounds at a sound source or vibrations at a vibration source are detected in the form of an analog value, and the analog value is converted into a digital value, or sounds at a sound source or vibrations at a vibration source are detected directly in the form of a digital value. Digital filtering is performed by using the digital value and a filter factor which is changed such that the result of digital filtering approaches a targeted value. The rate of contribution of the sound source or the vibration source to an evaluation point is diagnosed on the basis of the result of digital filtering. As a result, it is possible to diagnose the contribution of the sound source or the vibration source to the evaluation point when the result of digital filtering, i.e., in the case of a multiplicity of inputs, the total sum of digital filtering of the multiplicity of inputs, and, in the case of a single input, the total sum of digital filtering of a plurality of inputs generated in the past by delaying the single input, converges to the targeted value. In addition, in the present invention, the rate of contribution of the sound source or the vibration source to the evaluation point is computed and displayed. For this reason, the degree of contribution can be evaluated at a glance.

In the second aspect of the present invention, the analog value of sounds or vibration at a predetermined position detected by an analog sensor is converted into a digital value by the analog-digital converting circuit for converting the analog value into a digital value, or sounds or vibration at a predetermined position are detected directly in the form of a digital value by a digital sensor. Each of the filters performs digital filtering by using a filter factor and one of the plurality of digital values generated in the past by delaying the digital value. The changing means changes at least one of the filter factors such that the difference between the filter output and the targeted value becomes minimum, and the contribution-rate computing circuit computes the rate of contribution to the evaluation point by using outputs of the plurality of filters within a predetermined time when the difference becomes minimum. This rate of contribution is displayed on a display unit.

Thus, in the second aspect of the present invention, since the rate of contribution of one sound source or one vibration source is computed and displayed, it is possible to evaluate at a glance the rate of contribution of the sound source or the vibration source to the evaluation point.

In addition, in accordance with the third aspect of the present invention, sounds or vibrations at a plurality of predetermined positions are respectively detected in the form of analog values by analog sensors, and the analog values are respectively converted into digital values by the plurality of analog-digital converting circuits, or sounds or vibration at a plurality of predetermined positions are respectively detected directly in the form of digital values by digital sensors. Each of the plurality of filters performs digital filtering by using the digital value and a filter factor, and the changing means changes at least one of the filter factors such that the difference between the total sum of outputs of the plurality of filters and a targeted value becomes minimum. The contribution-rate computing circuit computes the rate of contribution to an evaluation point by using the outputs of the plurality of filters within a predetermined time when the difference becomes minimum. This rate of contribution is displayed on a display unit.

Thus, in the third aspect of the present invention, since the rate of contribution of a plurality of sound sources or vibration sources is computed and displayed, it is possible to evaluate at a glance the rate of contribution of the plurality of sound sources or vibration sources to the evaluation point.

As described above, in accordance with the present invention, it is possible to obtain an advantage in that, in a complicated acoustic or vibration system, it is possible to evaluate at a glance the rate of contribution of the sound source or vibration source to an evaluation point in real time and quantitatively.

The above and other objects, features and advantages of the present invention will become more apparent from the following detailed description of the invention when read in conjunction with the accompanying drawings.

DETAILED DESCRIPTION OF PREFERRED EMBODIMENTS

Referring now to the accompanying drawings, a detailed description will be given of an embodiment of the present invention. In this embodiment, the present invention is applied to the analysis of contribution of noise in a vehicle compartment.

Figure 1:
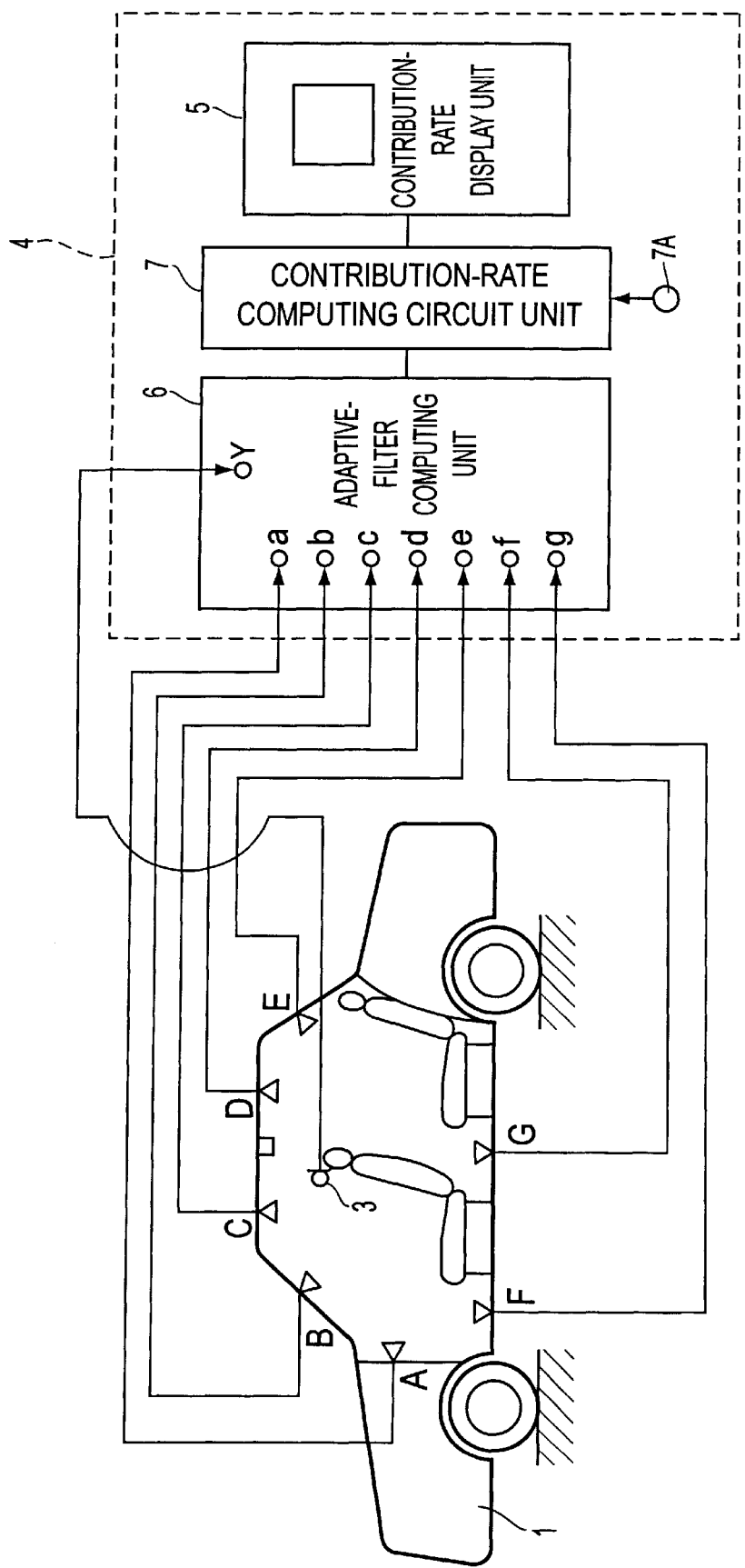
FIG. 1 is a block diagram illustrating an apparatus for analyzing contribution of noise in a vehicle compartment in accordance with an embodiment of the present invention.

In general, when countermeasures are devised for reducing noise in a vehicle compartment for the driver or occupant of the vehicle when the vehicle is running, it is very important to determine the contribution of sounds or vibrations, whose sound sources or vibration sources are major panels A to G in the compartment of a vehicle 1 shown in FIG. 1, to the noise close to the driver's or occupant's ears. This is because it is possible to implement an effective countermeasure if a means is provided by covering the portions (panels) in the order of the decreasing rate of contribution with a vibration-damping material, a sound-absorbing material or the like.

The apparatus for diagnosing the contribution of a sound source or a vibration source in this embodiment is comprised of a plurality of vibration sensors 2a to 2g constituted by acceleration sensors for detecting sounds at the sound sources or vibrations at the vibration sources in the form of analog values, as well as a microphone 3 for detecting sounds at an evaluation point. The vibration sensors 2a to 2g are respectively attached to the major panels A to G in the vehicle compartment, which are sound sources or vibration sources, while the microphone 3 is disposed at a position in the vicinity of the ears of the driver on a front seat.

The vibration sensors 2a to 2g and the microphone 3 are connected to a contribution analyzing device 4. The contribution analyzing device 4 is comprised of an adaptive filter computing unit 6, a contribution-rate computing circuit unit 7 that includes a personal computer or the like for computing the rate of contribution, and a changing means 7A, such as a keyboard, for setting various conditions such as time intervals for computing the rate of contribution, condition for converging the adaptive digital filters, frequency of the band-pass filter (later explained), and condition for displaying the type of paragraph, scale, coordinates and so on, which changing means is connected to the contribution-rate computing circuit 7, and further comprised of a contribution display unit 5 constituted by a CRT or the like.

Figure 2:
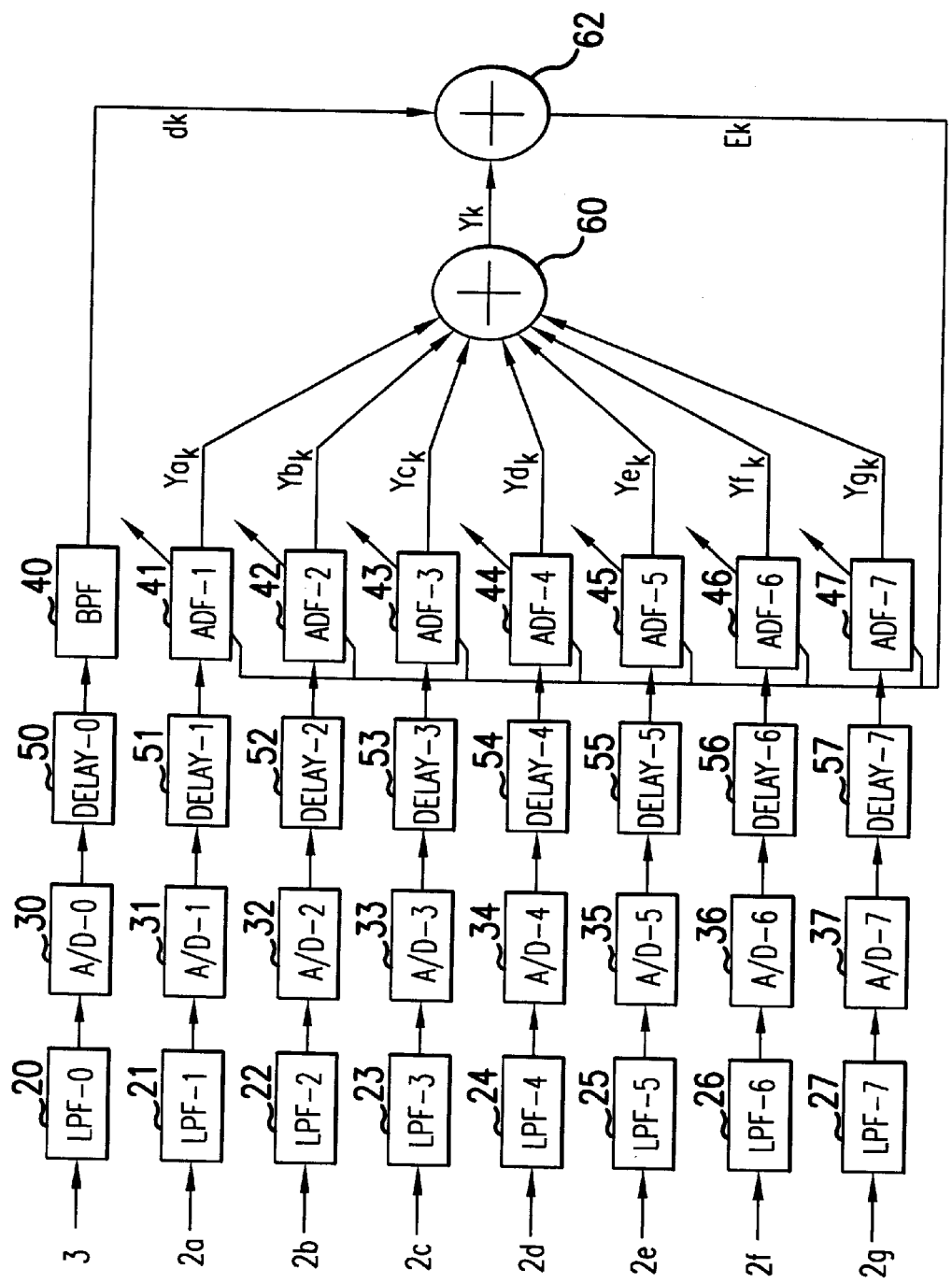
FIG. 2 is a block diagram illustrating the details of an adaptive-filter computing unit shown in FIG. 1.

As shown in FIG. 2, the adaptive-filter computing unit 6 is comprised of low-pass filters (LPFs) 20 to 27, i.e., anti-aliasing filters respectively connected to the microphone 3 and the vibration sensors 2a to 2g; A/D converters 30 to 37 connected respectively to the low-pass filters 20 to 27 to convert analog values into digital values at predetermined periods; delay circuits (Delays) 50 to 57 connected respectively to the A/D converters 30 to 37 to output the signals inputted thereto by delaying them predetermined durations; adaptive digital filters (ADFs) 41 to 47 connected respectively to the delay circuits 51 to 57 to perform digital filtering at the same periods as the A/D converters; an adder circuit 60 connected to the adaptive digital filters 41 to 47 to compute the total sum of the outputs from the adaptive digital filters 41 to 47; a bandpass filter (BPF) 40 connected to the delay circuit 50; and an adder circuit 62 for computing the difference between the output from the adder circuit 60 and the output from the band-pass filter 40 and for outputting a residual signal $E_k$. Output terminals of the adder circuit 60 are connected to the adaptive digital filters 41 to 47, and output terminals of the adaptive digital filters 41 to 47 are connected to the contribution-rate computing circuit unit 7.

Figure 3:
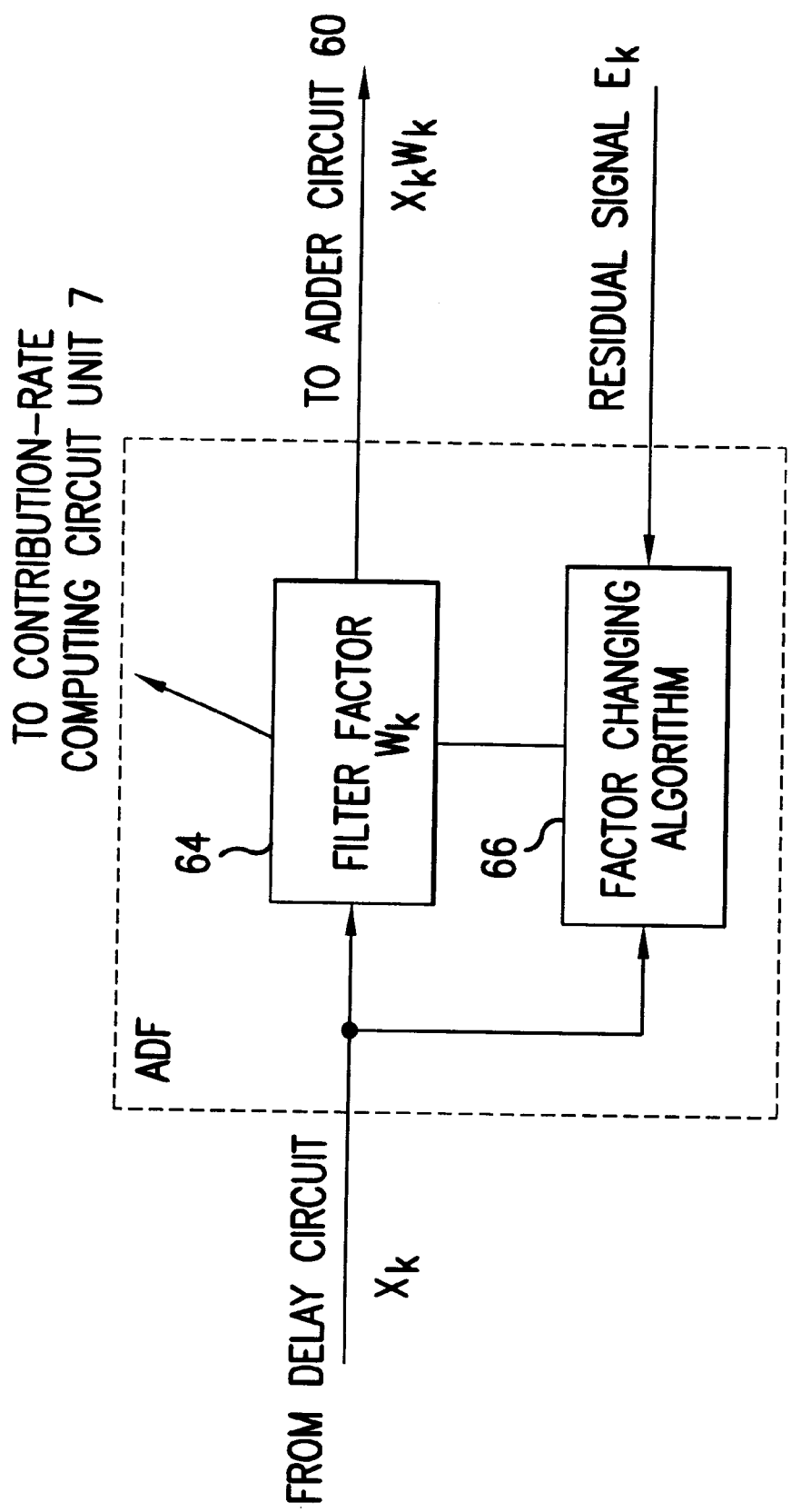
FIG. 3 is a block diagram schematically illustrating an adaptive digital filter shown in FIG. 1.

It is to be noted that the band-pass filter 40 can be made either by an analog filter such as Chebyshev, Butterworth, or by a digital filter. Each of the above-described adaptive digital filters is constituted by hardware such as a digital signal processor (DSP). As schematically shown in FIG. 3, each of the adaptive digital filters can be composed of a block 64 constituted by an FIR-type, IIR-type, or lattice-type digital filter for effecting digital filtering by computing the product of the digital value (vector-amount) X generated from the digital value $x_k$ and the filter factor (vector amount) W, and a block 66 for updating a filter factor so that the residual signal becomes minimum by means of a least mean square (LMS) algorithm, the Newton's method, or the steepest descent method, which are ordinary filter-factor updating algorithms. Incidentally, although the adaptive digital filters are preferably configured by hardware as described above in the light of high-speed computation, the adaptive digital filters may be configured by software.

Figure 10:
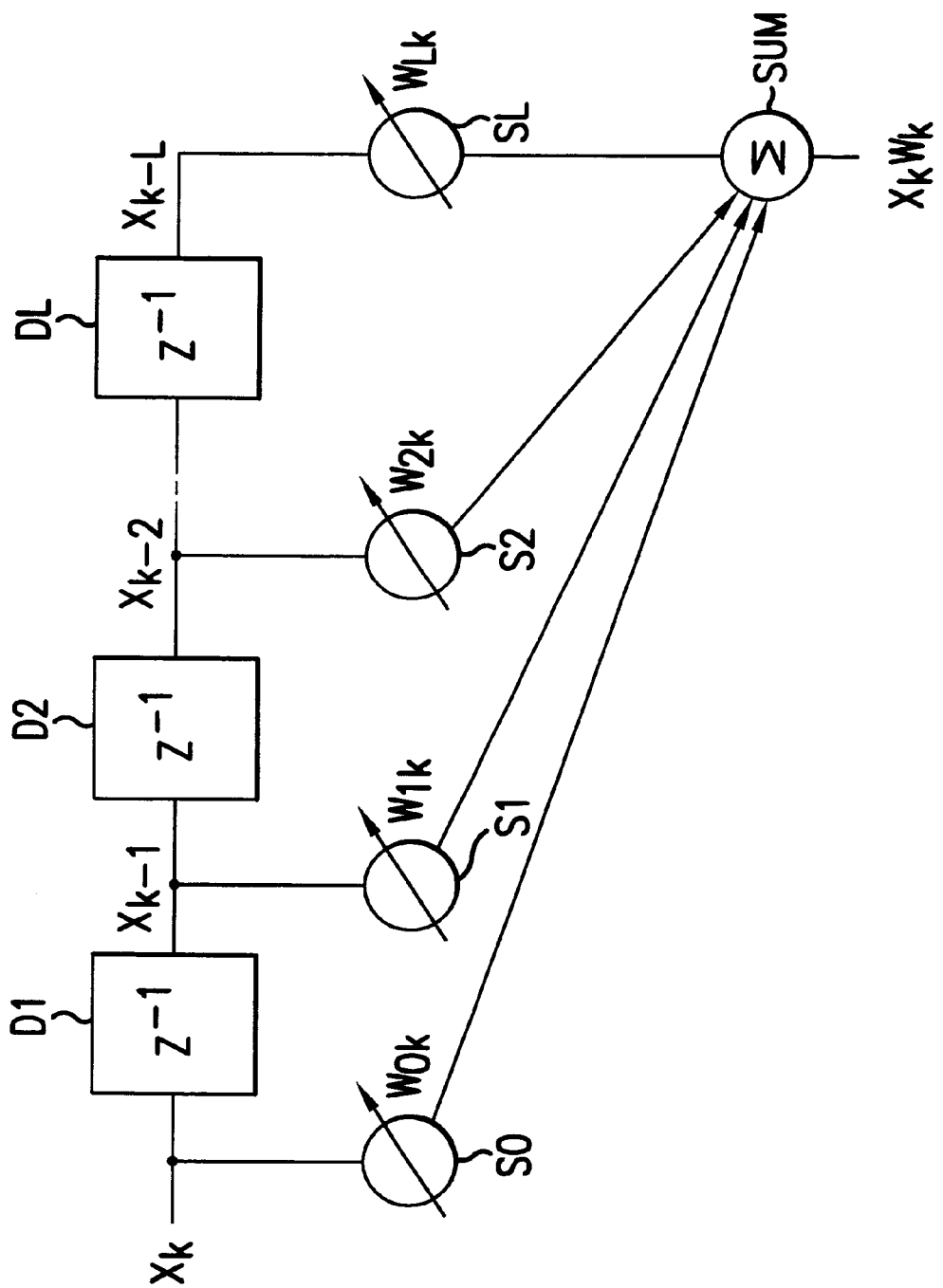
FIG. 10 is a schematic diagram showing details of the block 64 of FIG. 3.

The above explained block 64 of the adaptive digital filter is composed, as schematically shown in FIG. 10, of L pieces of delay circuits D1, D1, ..., DL for outputting the digital values $x_{k-1}, x_{k-2}, \ldots x_{k-L}$ which are generated by delaying the inputted digital values $x_k$, the (L+1) pieces of multiplying circuit S0, S1, ..., SL for computing the product of the digital values $x_{k-1}, x_{k-2}, \ldots x_{k-L}$ and the filter factors $w_{0k}, w_{1k}, \ldots w_{Lk}$ which have been changed by the block 66, and an adding circuit SUM for adding all the products thus computed.

When the matrix Xk is represented as $(x_k, x_{k-1}, x_{k-2}, \ldots, x_{k-L})$, and the matrix $w_k$ is represented as $(w_{0k}, W_{1k}, w_{2k}, \ldots, w_{LK})$, then the following signal, which is indicated as below, is outputted from each of the adaptive digital filters:

$$X_k W^T = x_k w_{0k} + x_{k-1} W_{1k} + x_{k-2} w_{2k} + \ldots + x_{k-L} w_{LK} \quad (1)$$

wherein "T" represents a transposition, and the above "$X_k W_k^T$" is represented merely as "$X_k W_k$" hereinafter.

Figure 4:
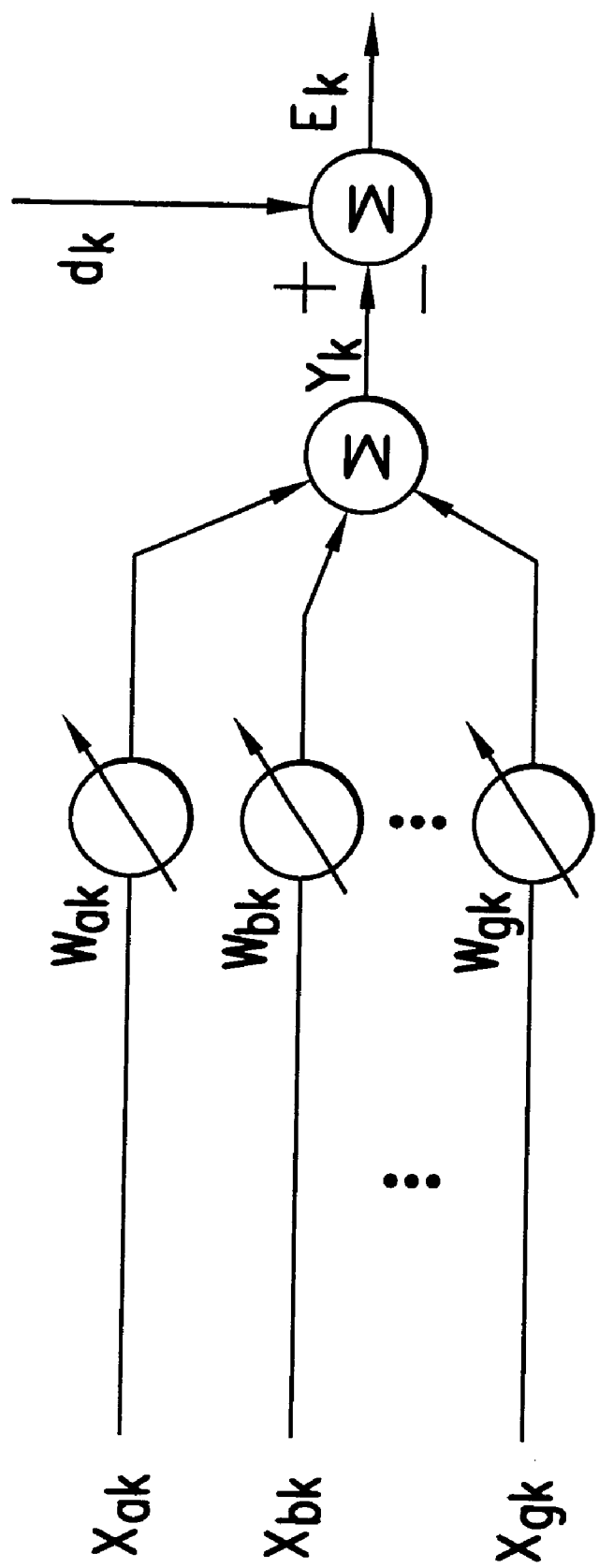
FIG. 4 is a schematic diagram of the adaptive-filter computing unit shown in FIG. 1.

The adaptive-filter computing unit 6 can be expressed as schematically shown in FIG. 4, adds digital filtering values in accordance with Formula (1) below, and outputs a total sum $Y_k$ (vector amount) at a timing k (present time) from the adder circuit 60. It is to be noted that each of the values in FIG. 4 "$x_{ak}, x_{bk}, x_{ck}, \ldots x_{gk}$" indicates an output (scaler amount) of the delay circuits 51 through 57 respectively.

$$Y_k = X_{ak} W_{ak} + X_{bk} W_{bk} + X_{ck} W_{ck} + \ldots + X_{gk} W_{gk} \quad (2)$$

where $X_{ak}, X_{bk}, X_{ck}, \ldots, X_{gk}$ represent the above-explained matrix $X_k$ to which indexes a through g are attached respectively corresponding to the adaptive digital filters 41 through 47, each indicating the digital value generated from the digital values $x_{ak}, x_{bk}, x_{ck}, \ldots x_{gk}$ inputted to the respective adaptive filters 41 through 47 at the timing k, whereas $w_{ak}, w_{bk}, w_{ck}, \ldots, w_{gk}$ represent the above-explained matrix $w_k$ to which indexes a through g are attached respectively corresponding to the adaptive digital filters 41 through 47, each indicating the filter factor of the respective adaptive digital filters 41 through 47 at the timing k The residual signal $E_k = d_k - Y_k$, which is the difference between an output $d_k$ of the band-pass filter 40 at the timing k and the total sum $Y_k$, is outputted from the adder circuit 62. Then, in the block 66, the filter factor is updated by using the LMS algorithm or the like so as to be set to a filter factor at a timing k+1 such that the residual signal $E_k$ becomes minimum (e.g., 0). It is to be noted that although at least one of the filter factors can be updated in accordance with conditions, all of them are usually updated.

Figure 5:
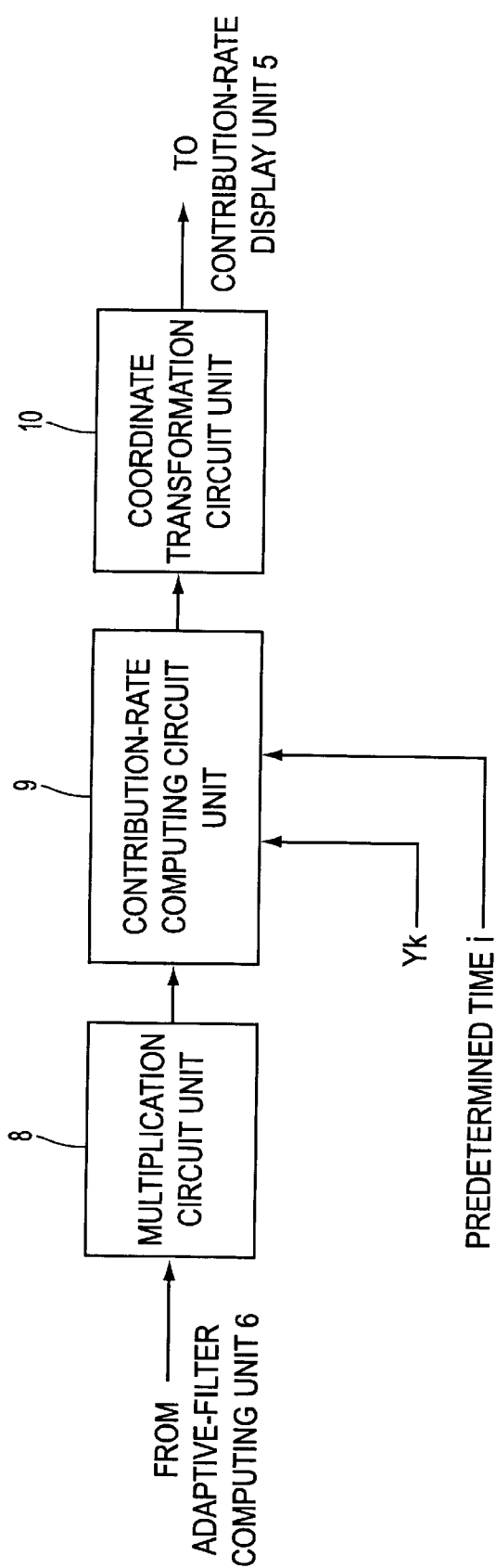
FIG. 5 is a block diagram of a contribution-rate computing circuit unit shown in FIG. 1.

The contribution-rate computing circuit unit 7, as illustrated in FIG. 5, is composed of a plurality of contribution-rate computing circuits connected respectively to the output terminal of the band-pass filter 40, output terminals of each of the adaptive digital filters 41 to 47, and to the output terminal of the adder circuit 62 that outputs the residual signal $E_k$. Each of the contribution-rate computing circuits is comprised of a multiplication circuit unit 8 for computing a square of the input signal; a contribution-rate computing circuit unit 9 for computing a square mean after adding the outputs of the multiplication circuit unit 8 within a predetermined time i (timing k–i to timing k) and for computing the contribution rate from this square mean; and a coordinate transformation circuit unit 10 for transforming coordinates to give a display corresponding to the type of graph, coordinates and a scale which have been designated. If $Y_{ak} = X_{ak} W_{ak}$, a square means value $Ya_{ab}$ with respect to the panel A within the predetermined time i can be expressed as shown in Formula (2) below by using digital filtering values within the predetermined time i.

$$Ya_{ab} = (Ya_k^2 + Ya_{k-1}^2 + Ya_{k-2}^2 + \ldots + Ya_{k-i}^2)/(i+1) \quad (3)$$

Similarly, if $Yb_k = X_{bk} W_{bk}$, $Yc_k = W_{ck} W_{ck}, \ldots, Y_{gk} = X_{gk} W_{gk}$, square means values with respect to the panels B to G can be expressed as follows:

$$Yb_{ab} = (Yb_k^2 + Yb_{k-1}^2 + Yb_{k-2}^2 + \ldots + Yb_{k-i}^2)/(i+1) \quad (4)$$

$$Yc_{ab} = (Yc_k^2 + Yc_{k-1}^2 + Yc_{k-2}^2 + \ldots + Yc_{k-i}^2)/(i+1)$$

$$\vdots$$

$$Yg_{ab} = (Yg_k^2 + Yg_{k-1}^2 + Yg_{k-2}^2 + \ldots + Yg_{k-i}^2)/(i+1)$$

In addition, the contribution rates become $Ya_{ab}/Y_k$, $Yb_{ab}/Y_k, \ldots, Yg_{ab}/Y_k$.

Next, a description will be given of the operation of this embodiment. The analog detection signals detected by the vibration sensors 2a to 2g are inputted respectively to the low-pass filters 21 to 27 where high-frequency components are removed. The output signals from the low-pass filters 21 to 27 are respectively inputted to the A/D converters 31 to 37 so as to be subjected to A/D conversion at predetermined periods, and are outputted as digital signals. These digital signals are inputted to the delay circuits 51 to 57, and after they are delayed, the digital signals are inputted to the adaptive filters 41 to 47 so as to be subjected to digital filtering at the same periods as those of the A/D converters. Their output signals $Ya_k$ to $Yg_k$ are respectively inputted to the adder circuit 60.

Meanwhile, the detection signal (target signal) from the microphone 3 is inputted to the low-pass filter 20 which is an anti-aliasing filter, and its output signal is inputted to the A/D converter 30 so as to be converted into a digital signal at a predetermined period and is outputted therefrom. This digital signal, after passing through the delay circuit 50, is inputted to the band-pass filter 40 for restricting an analytical frequency band, and its output signal $d_k$ is inputted to the adder circuit 62.

Here, by using the aforementioned delay circuits 51 to 57, it is possible to compensate for the delay of the signal due to its passage through the band-pass filter 40 for restricting the analytical frequency band. In other words, it becomes possible to ensure the simultaneity in the time axis between the signal $d_k$ and the signals $Ya_k$ to $Yg_k$, and to probe the sound sources or vibration sources. In order to ensure the simultaneity of the signals in the time axis, it is preferable to use the delay circuits 51 to 57, but, ordinarily, there are many cases where the analysis of contribution is possible without the use of the delay circuits 51 to 57. Incidentally, the delay circuit 50 is used for checking the performance using simulation or a model signal or checking the operation of the circuits or for other similar purposes, and may not be used ordinarily.

The outputs from the respective blocks of the adaptive digital filters 41 to 47 are inputted to the contribution-rate computing circuit unit 7, which computes the rates of contribution by using the output signals $Ya_k$ to $Yg_k$ from the adaptive digital filters and the total sum $Y_k$, as described above.

Figure 6:
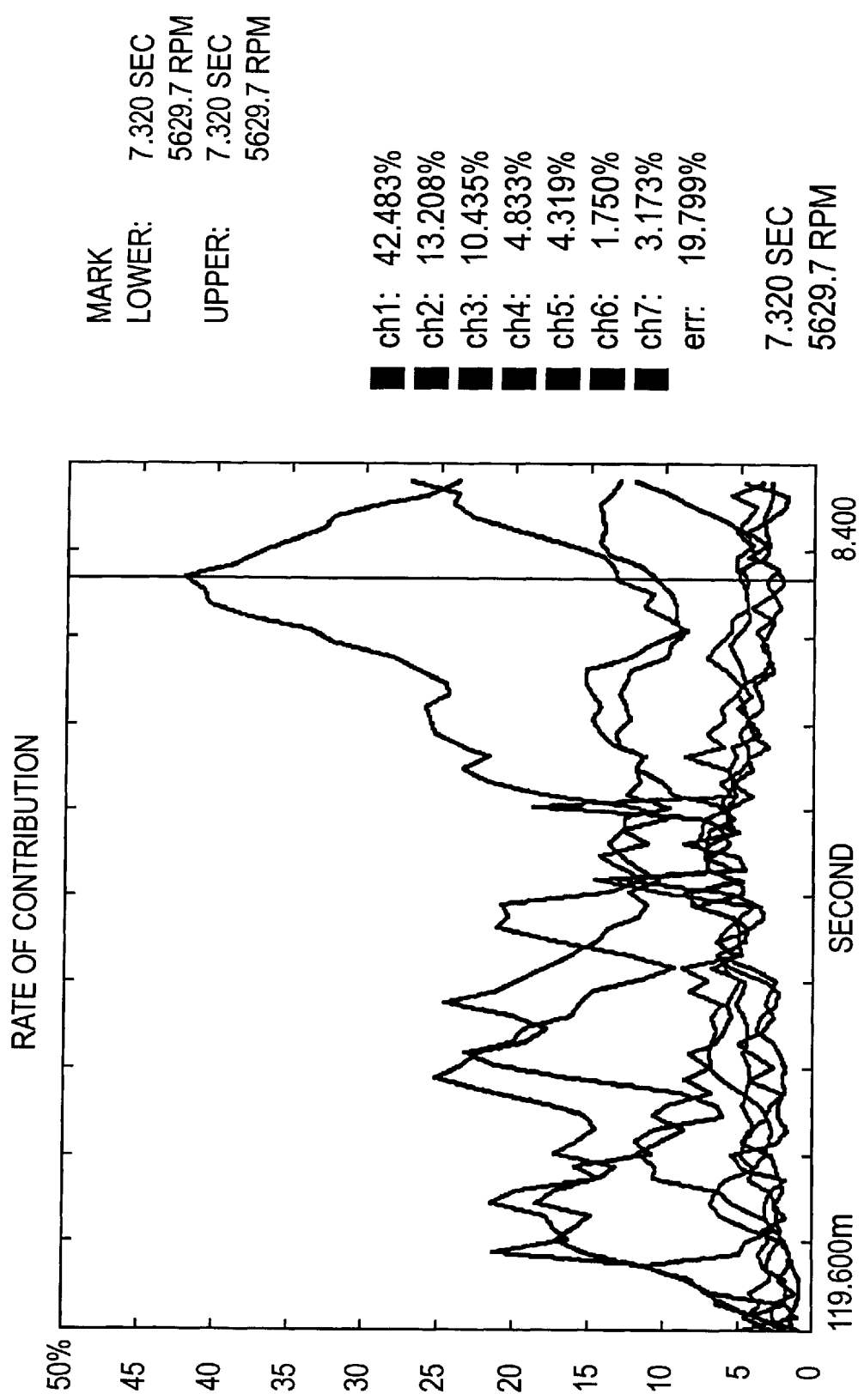
FIG. 6 is a graph illustrating the results of an output with time taken as the abscissa in accordance with the embodiment.
Figure 7:
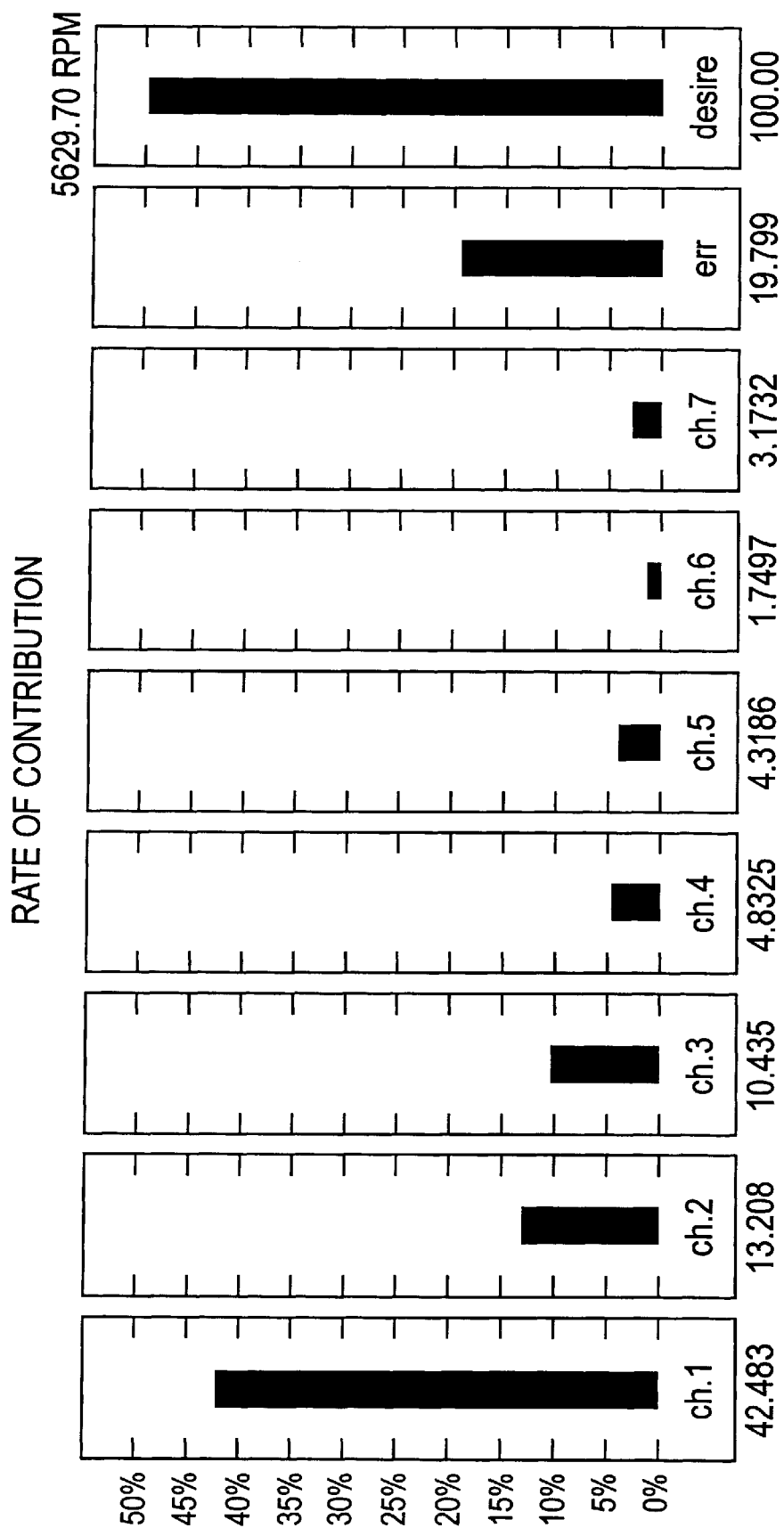
FIG. 7 is a bar graph illustrating the results of an output in accordance with the embodiment.
Figure 8:
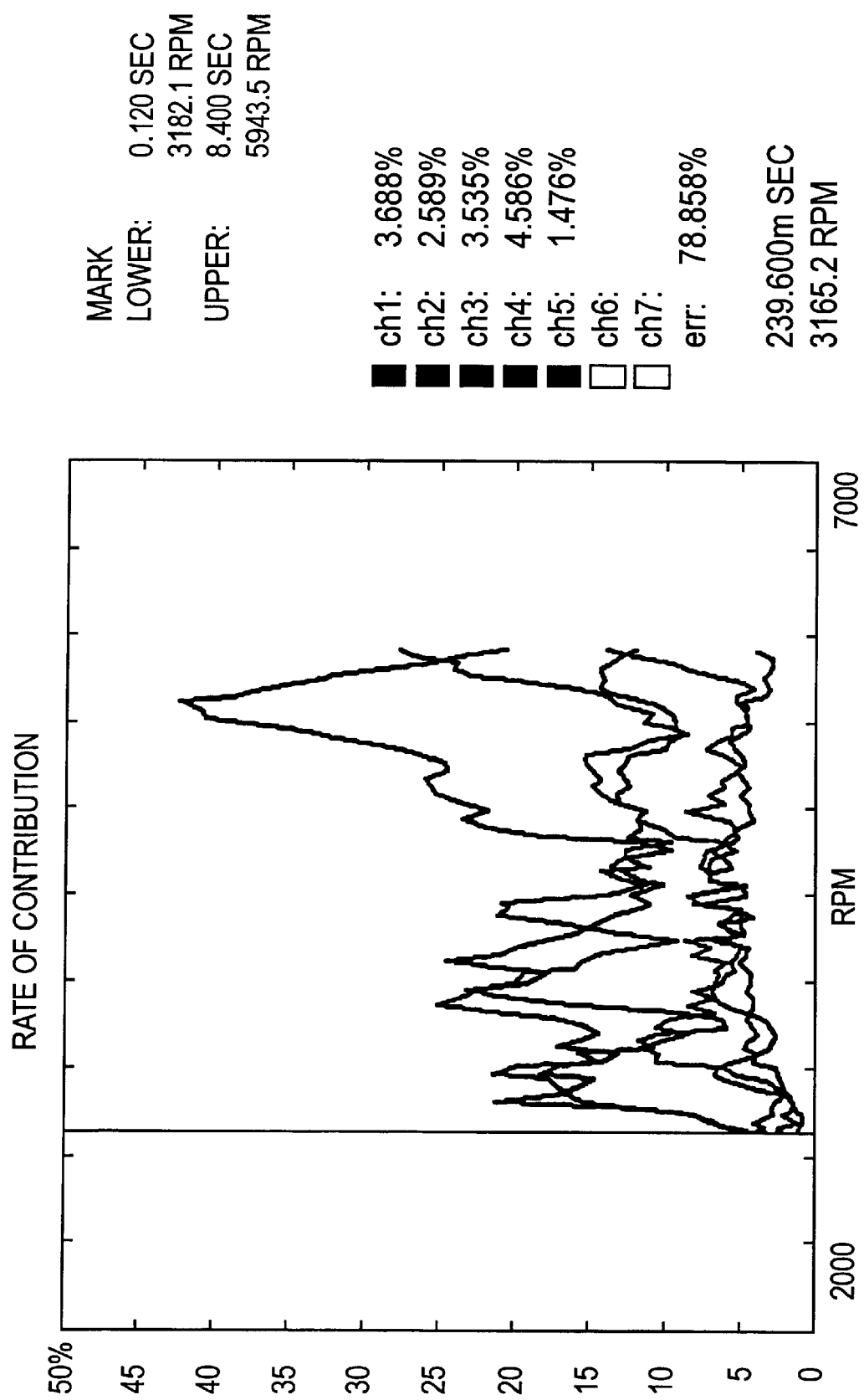
FIG. 8 is a graph illustrating the results of an output with the engine speed taken as the abscissa in accordance with the embodiment.
Figure 9:
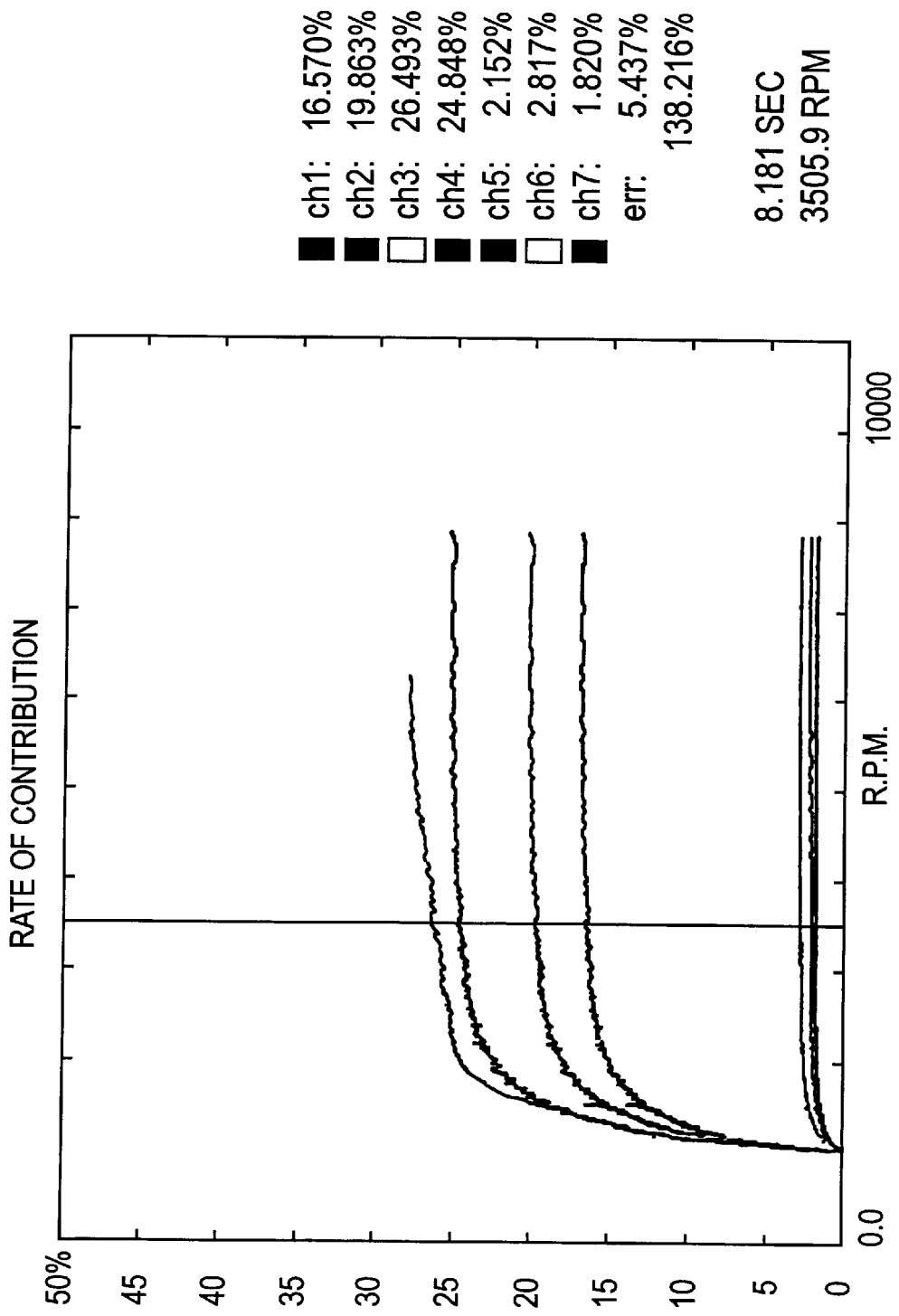
FIG. 9 is a graph illustrating the results of an output with the engine speed taken as the abscissa in accordance with the embodiment.

Then, these rates of contribution are displayed in real time as graphs as shown in FIGS. 6, 8, and 9, or as a bar graph such as shown in FIG. 7. It should be noted that, in these graphs, ch1 to ch7 denote the values of the panels A to G, respectively, err denotes the residual, and desire denotes a target signal.

Since the filter factor is changed by the block 66 such that the residual signal $E_k$ becomes minimum, the rate of contribution when the residual has finally converged to a predetermined value is computed and displayed, i.e., the rate of contribution to an evaluation point is computed and displayed by using filter outputs within a predetermined time when the residual becomes minimum.

In the contribution-rate computing unit 7, the display time interval of the bar graph display can be adjusted by changing the mean time interval, and the confirmation of the results can be facilitated by designating a short mean time interval with respect to a signal which changes fast, and by designating a long mean time interval with respect to a steady signal. In addition, the confirmation of the results can be further facilitated by making variable a full scale of 50%, 100% or the like.

Although, in the above, the rates of contribution were computed by using square mean values, the rates of contribution may be computed by using mean values of $Ya_k$ to $Yg_k$ as follows:

$$(Ya_k + Ya_{k-1} + Ya_{k-2} + \ldots + Ya_{k-i})/\{(i+1) \cdot Y_k + E_k\} \quad (5)$$
$$(Yb_k + Yb_{k-1} + Yb_{k-2} + \ldots + Yb_{k-i})/\{(i+1) \cdot Y_k + E_k\}$$
$$\vdots$$
$$(Yg_k + Yg_{k-1} + Yg_{k-2} + \ldots + Yg_{k-i})/\{(i+1) \cdot Y_k + E_k\}$$

Figure 11:
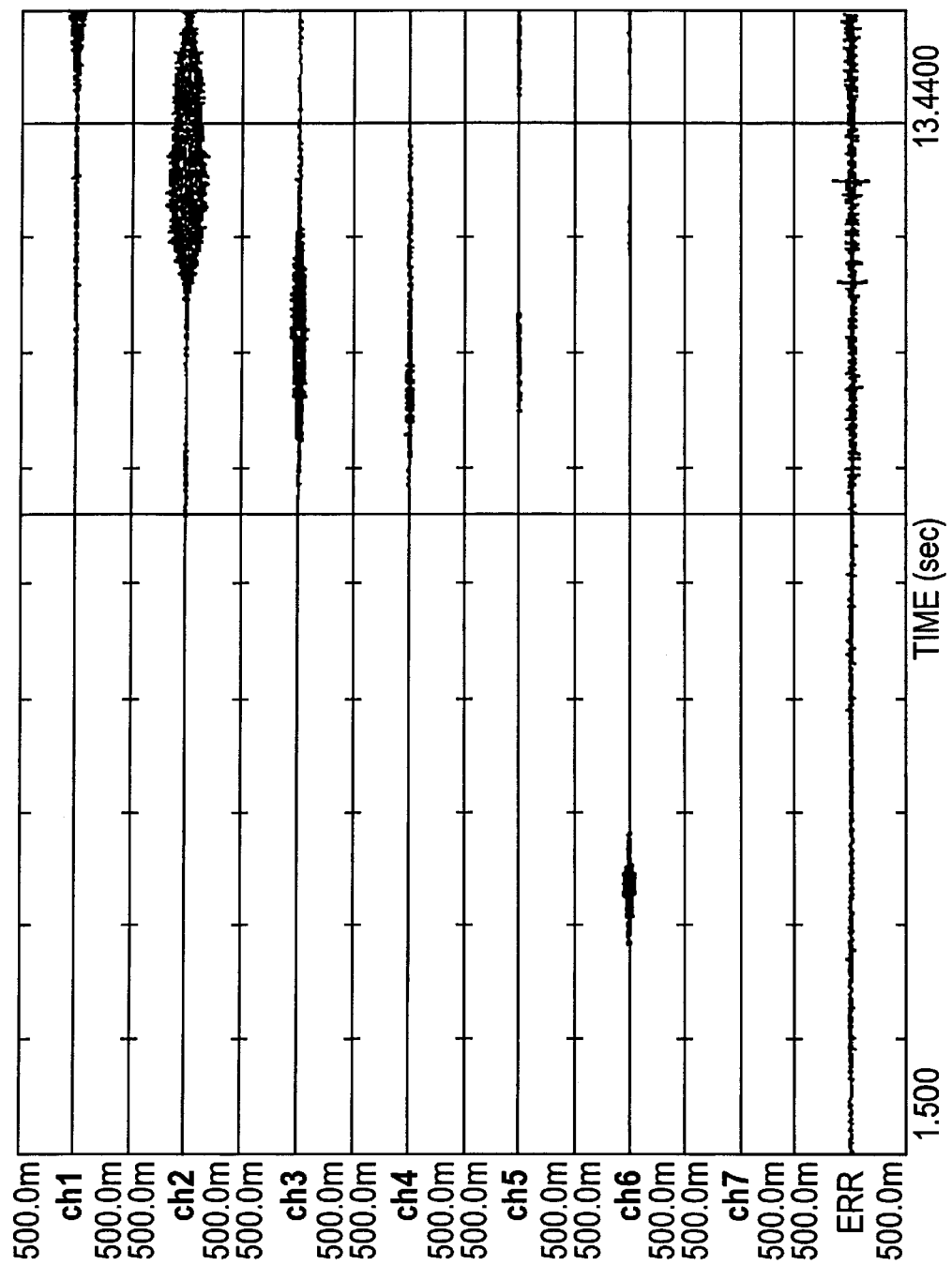
FIG. 11 is a graph illustrating the results of an output in a conventional example.

FIG. 11 shows the results of analysis of contribution during fixed-speed running (50 km/h) by the conventional technique and apparatus for analyzing contribution in the time domain. From this diagram, it is possible to evaluate a panel having a large rate of qualitative contribution, but it is impossible to evaluate the degree of quantitative contribution. The same applies to the results of analyzing contribution during accelerated running, and it is possible to evaluate a time-series change in the qualitative contribution, but it is impossible to evaluate the degree of quantitative contribution.

FIG. 7 shows the results of output during fixed-speed running in accordance with the above-described embodiment. From the bar graph shown therein, it is possible to ascertain at a glance the rates of quantitative contribution of the vibrations of the respective panels to the incompartment noise at a predetermined engine speed (5629.70 rpm, this value is changeable).

FIGS. 6 and 8 show the results of output by the apparatus for analyzing contribution in accordance with the above-described embodiment. In the graph shown in FIG. 6, the abscissa shows time, while the ordinate shows the rate of contribution. In the graph shown in FIG. 8, the abscissa shows the engine speed, while the ordinate shows the rate of contribution. From these graphs, it is possible to quantitatively determine the time (or engine speed) dependence of the rate of contribution of each panel. Furthermore, from each of these graphs, it is possible to display a bar graph, similar to the one shown in FIG. 7, at an arbitrary time (or engine speed). Additionally, FIG. 9 is a graph in which the scale is changed.

Figure 12:
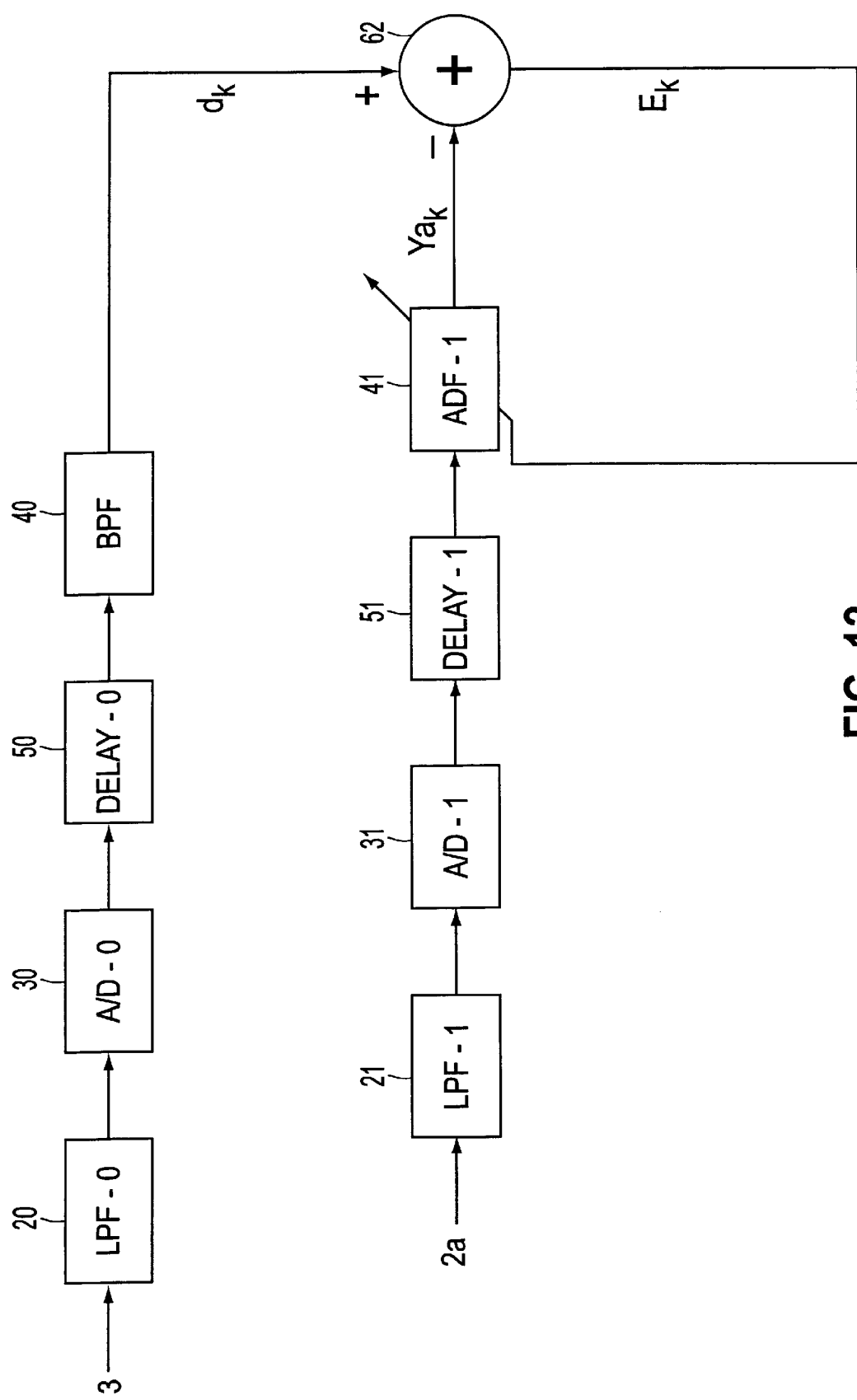
FIG. 12 is a block diagram showing a contribution-rate analyzing device in an automobile wherein a single signal is inputted.

Although, in the above, a description has been given by citing an example in which a multiplicity of signals are inputted to the adaptive-filter computing unit, the present invention can be applied to a case where a single signal is inputted. FIG. 12 shows a block diagram of the apparatus for diagnosing sound source and vibration source in a case in which a single signal is inputted, using only the above sensor 2a as a sole sensor.

In this case, the computing circuit 60 is obviated, and at least one of a plurality of filter factors $w_{0k}, w_{1k}, w_{2k}, \ldots, w_{LK}$ disposed in the adaptive digital filter is updated.

Further, the rate of the contribution in this case is, when a square mean value $Ya_{ab}$ is applied, represented as $Ya_{ab}/(Ya_k + E_k)$, while when a mean value is applied, it is represented as below:

$$(Ya_k + Ya_{k-1} + Ya_{k-2} + \ldots + Ya_{k-1})/\{(i+1)(Ya_k + E_k)\}.$$

Since the other arrangements are similar to those described above, a description thereof will be omitted.

By the way, in the present embodiment, in a case in which a lot of noise component is included in the inputted signals from the respective sensors 2a through 2g, there are cases where higher-accuracy results can be obtained if the band-pass filters having the same characteristics as the band-pass filter 40 which is for restricting the frequency band subject to analysis are inserted before each of the digital filters, namely between the adaptive digital filters 41 through 47 and the delay circuits 51 through 57, or between the A/D converters 31 through 37 and the delay circuits 51 through 57.

As described above, in this embodiment, the contribution of sounds or vibrations to an evaluation point including phase information, is diagnosed by the use of adaptive digital filters, short-time data and data which changes fast, such as transient data, can also be handled easily, and the rate of contribution can be determined in real time and quantitatively. Thus the practical values of the technique and apparatus in accordance with the present invention are very high. Additionally, since the degree of contribution can be evaluated in real time and quantitatively as compared with the conventional masking method, method of analyzing contribution in the frequency domain, and method of analyzing contribution in the time domain, the technique and apparatus become very effective.

For this reason, it becomes possible to adopt a countermeasure against noise and vibrations efficiently and accurately, and since the rate of contribution is determine quantitatively, it becomes possible to quantitatively estimate the effect of the countermeasure to a certain extent.

In addition, the present invention is applicable to cases where sound sources or vibration sources having high causal relationships are selected when active control of noise and vibrations is carried out, and cases where the effect of active control is quantitatively estimated.

In this embodiment, there are cases where higher-accuracy results can be obtained by performing filtering processing with respect to sounds or vibrations (input signals) detected by sensors, by using low-pass filters, high-pass filters, bandpass filters, or the like before performing digital filtering processing, so as to clearly restrict a frequency band subject to analysis.

In addition, in a case where the frequency band subject to analysis changes over time in synchronism with the engine speed or the like, it is an effective analyzing method to analyze contribution by using a tracking filter synchronize with the engine speed.

In this embodiment, signals detected by a microphone and amplified by a noise level meter, an amplifier, or the like are generally used for sounds, while signals detected by a displacement sensor, a velocity sensor, an acceleration sensor, or the like and amplified by an amplifier are generally used for vibrations. Also, it is possible to alternatively use electric signals which are completely correlated with sounds or vibrations.

In this embodiment, it is possible to obtain a frequency characteristic of the rate of contribution by converting an output signal of filtering to a frequency domain by means of FFT or the like.

Furthermore, the rates of contribution of respective inputs in the frequency domain can be determined by dividing an output signal of filtering by the total sum of frequency spectra or power spectra outputted by a plurality of filters by using frequency spectra or power spectra obtained by averaging in a predetermined time.

In addition, by converting each digital filter factor into the frequency domain by means of FFT or the like, it is possible to determine a transfer characteristic between each input signal (sound or vibration) and an evaluation-point signal (sound or vibration), thereby making it possible to obtain effective information concerning a countermeasure against noise and vibrations or a design for reduced noise.

Although in the above a description has been given of an example in which sounds or vibrations, after being detected in the form of an analog value, are converted into a digital value, it is possible to use a sensor for detecting the sounds or vibrations directly in the form of digital value.

In addition to the above-described embodiment, the present invention is applicable to problems in various fields, such as the problem of noise and vibrations of general machines and equipment, the problem of noise and vibrations of vehicles, the identification of sound sources and vibration sources in the railroad noise and vibrations, the problem of noise and vibrations of office automation (OA) equipment, and the problem of noise and vibrations of building structures, and the like.

It is further to be noted that in the above embodiments, it is explained that the rate of contribution including the residual difference is computed in the case in which the residual signal EK is converged to a predetermined value close to the minimum value, and the both rate of the contribution and the residual difference are displayed. However, since, when the residual signal $E_k$ is to be converted to "0", the residual signal $E_k$ becomes "0", so that the rate of contribution without any residual difference is computed, and thus, the residual difference is not displayed.

As explained heretofore, according to the present invention, in a complex sound system and/or vibration system, the rate of quantitative contribution of the sound source and/or vibration source to the evaluation point in operating conditions can be judged in real time just at a glance, even in a state that the residual difference still exists.

What is claimed is:

1. A method of diagnosing a rate of contribution of at least one sound source or at least one vibration source to an evaluation point, comprising the steps of:

detecting sounds at the at least one sound source or vibrations at the at least one vibration source and outputting a signal corresponding to the at least one sound source or the at least one vibration source in the form of a digital value;

performing a digital filtering process by using the digital value, and a filter factor, which is changed during the digital filtering process such that a result of the digital filtering process approaches a targeted value, said filtering process being performed by one of a plurality of filters; and computing the rate of contribution of the at least one sound source of the at least one vibration source to the evaluation point as a ratio of a mean value or a square mean value of the respective output of said plurality of filters within a predetermined time, to a total sum of the output of all of said plurality of filters within the predetermined time when the difference between the total sum of results of the digital filtering process and the targeted value becomes minimum, and then displaying the computed rate of contribution.

2. The method according to claim 1, wherein the rate of contribution of the at least one sound source or the at least one vibration source to the evaluation point is computed on the basis of a result of digital filtering at a time when a total sum of the values obtained by performing the digital filtering process with respect to each of the plurality of digital values generated by delaying the digital value with respect to one of the at least one sound source or one of the at least one vibration source converges to the targeted value.

3. The method according to claim 1, wherein a digital filtering process processes a plurality of digital values from respective plurality of sound sources or vibration sources such that a total sum of the results of the digital filtering process converges to the targeted value.

4. An apparatus for diagnosing a rate of contribution of at least one sound or at least one vibration source to an evaluation point, comprising:

means including a sensor for detecting sounds or vibrations at a predetermined position in the form of an analog value;

an analog-digital converting circuit for converting the analog value into a digital value;

a plurality of filters, each adapted to perform digital filtering by using a filter factor and a plurality of digital values generated by delaying the digital value;

changing means for changing the filter factor of at least one of the plurality of filters such that a difference between a total sum of results of the digital filtering process and a targeted value becomes minimum; and a contribution rate computing circuit for computing the rate of contribution of the at least one sound source or the at leat one vibration source to the evaluation point by using an output of each of said plurality of filters within a predetermined time when the difference becomes minimum, wherein said contribution rate computing circuit computes the rate of contribution of each of the at least one sound source or the at least one vibration source to the evaluation point as a ratio of a mean value or a square means value of the respective output of said plurality of filters within the predetermined time, to a total sum of the output of all of said plurality of filters within the predetermined time when the difference becomes minimum.

5. The apparatus according to claim 4, wherein the targeted value is an output of another analog-digital converting circuit for converting into a digital value an analog value detected by a sensor for detecting sounds or vibrations at the evaluation point and outputting a signal in the form of an analog value, or an output of another sensor for detecting sounds or vibrations at the evaluation point and outputting a signal in the form of a digital value.

6. The apparatus according to claim 5, wherein the targeted value is outputted via a band-pass filter for restricting a frequency band for analysis.

7. The apparatus according to claim 6, further comprising a plurality of delay circuits which receive and delay the digital value for compensating for delay due to passage of the targeted value to said band-pass filter.

8. An apparatus for diagnosing a rate of contribution of at least one sound source or at least one vibration source to an evaluation point, comprising:

means including a plurality of sensors each detecting sounds or vibrations at a predetermined position and outputting a signal corresponding to the at least one sound source or the at least one vibration source in the form of a digital value;

a plurality of filters, each adapted to perform digital filtering by using the digital value and a filter factor;

changing means for changing the filter factor of at least one of the plurality of filters such that a difference between a total sum of outputs of said plurality of filters and a targeted value becomes minimum; and a contribution-rate computing circuit for computing the rate of contribution of the at least one sound source or the at least one vibration source to the evaluation point by using the outputs of said plurality of filters within a predetermined time when the difference becomes minimum, wherein said contribution rate computing circuit computes the rate of contribution of each of the at least one sound source or the at least one vibration source to the evaluation point as a ratio of a mean value or a square mean value of the respective output of said plurality of filters within the predetermined time, to a total sum of the output of all of said plurality of filters within the predetermined time when the difference becomes minimum.

9. The apparatus according to claim 8, wherein the targeted value is an output of another analog-digital converting circuit for converting into digital value an analog value detected by a sensor for detecting sounds or vibrations at the evaluation point and outputting a signal in the form of the analog value.

10. The apparatus according to claim 9, wherein the targeted value is outputted via a band-pass filter for restricting a frequency band for analysis.

11. The apparatus according to claim 10, further comprising a plurality of delay circuits which receive and delay the digital value for compensating for delay due to passage of the targeted value through said band-pass filter.

12. The method according to claim 1, wherein a signal corresponding to the at least one sound source or at least one vibration source is initially output in the form of an analog value and then converted into the digital value.

13. The apparatus according to claim 8, wherein a signal corresponding to the at least one sound source or at least one vibration source is initially output in the form of an analog value and then converted into the digital value.

* * * * *